United States Patent
Khrenov et al.

[15] 3,688,382
[45] Sept. 5, 1972

[54] METHOD OF PRESSURE WELDING OF METALS AND DEVICE FOR ITS REALIZATION

[72] Inventors: Konstantin Konstantinovich Khrenov, ulitsa Cheljuskintsev, 15, kv. II; Pavel Ivanovich Gursky, Bulvar Lesi Ukrainki, 2, kv. 58; Grigory Alexandrovich Shulman, ulitsa Vladimiro-Lybedskaya, 16, kv. 48; Gennady Alexeevich Klimenko, ulitsa Izhakevicha, 7/10, kv. 71; Ivan Viktorovich Kirdo, ulitsa Aviatsu, 8, kv. 55; Georgy Viktorovich Dmitrenko, ulitsa Stepana Khalturina, 14, kv. 3; Ivan Nikolaevich Yagupov, ulitsa Artema, 12, kv. II, all of Kiev; Mark Irmovich Tsyrlin, prospekt Kirova, 4, kv. 13, Gorky; Anatoly Petrovich Novikov, propekt Ilicha, 32a, kv. 50, Gorky; Filimon Efimovich Puzov, ulitsa Krasnykh partizan, 8, kv. 63, Gorky, all of U.S.S.R.

[22] Filed: March 16, 1970

[21] Appl. No.: 19,842

[30] Foreign Application Priority Data
May 5, 1969 U.S.S.R. ............1332271

[52] U.S. Cl. ............29/470.1, 29/505, 29/514, 228/3
[51] Int. Cl. ............B23k 21/00
[58] Field of Search .......228/3, 4, 44; 29/470.1, 505, 29/514

[56] References Cited

UNITED STATES PATENTS

| | | | |
|---|---|---|---|
| 3,265,277 | 8/1966 | Bacroix | 228/44 |
| 3,247,591 | 4/1966 | Panseri | 228/44 X |
| 1,446,973 | 2/1923 | Tunkers | 29/505 |

*Primary Examiner*—John F. Campbell
*Assistant Examiner*—R. J. Craig
*Attorney*—Waters, Roditi, Schwartz & Nissen

[57] ABSTRACT

Pressure welding of metals is effected by subjecting the welded metal to plastic deformation by forcing a working tool into the metal, the squeezing speed of the working tool being changed relative to the speed of flow of the welded metal so that at the moment of welding the squeezing speed is between 0.1 and 0.6 of the flow speed.

7 Claims, 4 Drawing Figures

PATENTED SEP 5 1972

3,688,382

METHOD OF PRESSURE WELDING OF METALS AND DEVICE FOR ITS REALIZATION

The present invention relates to methods of pressure welding and to devices for their realization.

Known in the art are several methods of pressure welding metals wherein plastic deformation of metal is achieved with the aid of a forced-in working tool, such methods including: spot welding with unilateral and bilateral upsetting, butt welding, and roll welding.

The basic parameters for the above-mentioned welding methods are a required degree of metal flow and the magnitude of the squeezing force.

A peculiar feature of the known welding methods is that the process of welding is accompanied by an intensive flow of the metals in the contact layers, perpendicularly to the direction of the squeezing force. The velocity of metal flow in this direction is higher than the speed of its squeezing.

In spot welding with unilateral or bilateral upsetting, the intensive flow of metal from under the punches is hampered by the resistance of the peripheral zone to upsetting. To ensure high-quality welding, the metals have to squeezed to a higher degree than in other types of welding. When the metals are squeezed by punches with a relatively large bearing area, the degree of metal flow decreases a little, but the squeezing force increases sharply.

Butt welding differs from spot welding in the physical conditions prevailing on the contact surfaces between the working tool and the metal being welded. The peripheral zone here is nonexistent but steady welding is achieved at the moment when the speed of lateral flow exceeds the squeezing force by at least three times. The degree of metal flow is about 70 percent of the flow in the case of unilateral upsetting and the upsetting force is reduced almost 1.5 times. Further increase of the velocity of flow of the welded metal in butt welding is impossible.

In roll welding, it is difficult to weld the blanks (strips, bands and sheets) in one pass because the degree of squeezing in this method is limited by the physical conditions of squeezing on the surfaces of contact between the rolls and the metal being welded. Therefore, this method cannot provide the high specific squeezing pressure required for welding. Here the metal flows intensively from under the rolls in the direction of their rotation, the speed of this flow being even able to exceed the squeezing speed by 50 times approximately.

The most decisive factor is the ratio of the squeezing and flow speeds (particularly the forcing-in speed of the working tool). The correct determination and provision of the required ratio of the squeezing and flow speeds in the direction of intensive flow of the metals being welded contribute to the optimum power-consuming conditions of welding. This cannot be ensured by the above-listed methods of pressure welding.

The main object of the invention is to provide a method of pressure welding by plastic deformation of the metal achieved by forcing-in a working tool, and a device for its realization which, as compared with the known methods and devices, will provide for the optimum welding conditions, for example, by reducing the power of the drive.

The object of the invention is achieved by providing a method of pressure welding of metals by plastic deformation of the metal effected by forcing the working tool into the metal wherein, according to the invention, the squeezing speed of the tool at the moment of welding is 0.1 to 0.6 of the flow speed of the metal being welded.

For welding low-ductility metals and alloys it is practicable that the welded metals be heated to a temperature sufficient for their plastic flow.

The method of the invention is realized with the aid of a device wherein the metal is squeezed between the working tool and the support and, according to the invention, the working tool is made in the form of a cam and the support is installed with the capability of displacement in the direction of the greatest flow of the metal being squeezed.

For lap welding of strips it is preferred that the support be installed with provision for displacement in the direction of movement of the cam at the point of its contact with the metal being welded.

For welding such ductile metals as aluminum and copper, the support may be flat.

The reliability of gripping may be increased by making the cam surface fluted.

Slipping of the welded metal over the support may be reduced by also making the support fluted.

Now the invention will be described in detail by way of example with reference to the accompanying drawings in which.

Figure 2:
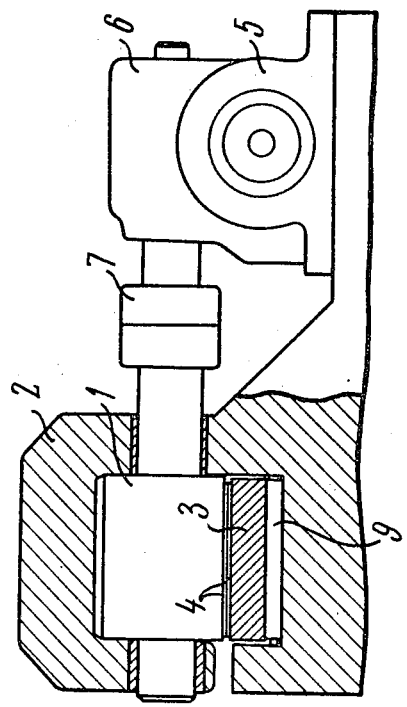
FIG. 2 is a section taken along line II—II in FIG. 1.

In the device for pressure welding of metals by plastic deformation of the metal caused by forcing the working tool into it, the metal is squeezed between the working tool and the support. The working tool is made in the form of a cam 1 (FIG. 1) installed in a housing 2. The same housing accommodates a movable support 3 on which the blanks 4 to be welded are placed. For facilitating the removal of the welded blanks the housing 2 may be cantilevered. The cam 1 can be rotated by an electric motor 5 (FIG. 2) via a speed reducer 6 and a safety coupling 7 which excludes stopping of the motor 5 in the course of operation.

The upper surface of the support 3 is inclined to the horizontal axis of the cam 1 so that the squeezing speed is 0.1—0.6 of the speed of the flow and the ratio of these speeds remains constant within the entire process of welding.

While using the cam 1 with the constant section along its axis of rotation, the support 3 is installed in the housing 2 with a provision for displacement in the direction of the cam rotation. For improving the operating conditions of the support and eliminating the jerks, said support may be provided with a damping device of any known design.

The minimum operating clearance between the working surface of the cam 1 and the surface of the support 3 should not be greater than the thickness of one of the blanks 4 being welded (strip, band or sheet); the maximum clearance between these surfaces must be equal to, or a little larger than, the total thickness of the ends of blanks 4 prepared for welding.

To improve gripping and reduce slipping, the working surfaces of the cam 1 and support 1 may be made fluted (rough).

When welding metals featuring good seizure at a small displacement, the surface of the housing 2 over which the support 3 moves, is provided with rolls 9.

Figure 1:
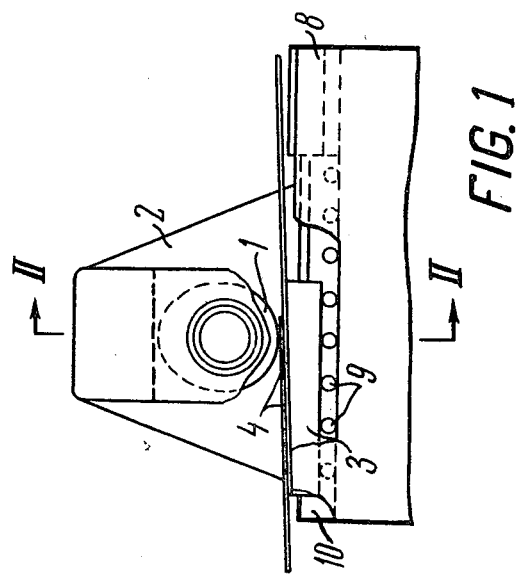
FIG. 1 is an elevation view of a device for lap welding of blanks with the working tool in the form of a cam and an inclined suppert.
Figure 3:
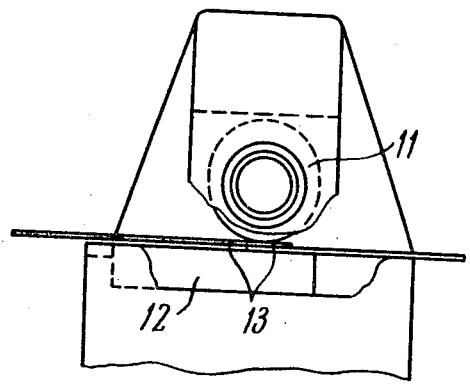
FIG. 3 is an elevation view of a device for lap welding of ductile metal blanks with the working tool in the form of an eccentric and a flat support.

The housing 2 has a stop 10 for setting the support 3 to the initial position. Shown in FIG. 3 is a device intended for welding strips of ductile metals (aluminum and copper) and low-carbon steels. The working tool of this device is made in the form of an eccentric 11 and the support 12 is flat; the minimum and maximum clearances between the working surfaces of the eccentric 11 and support 12 are selected to suit the thickness of the welded strips 13 within the limits quoted above. The drive of the eccentric 11 is similar to that of cam 1 as illustrated in FIG. 1.In this case the support 12 has no damping device. The support 12 moves in the direction of rotation of the eccentric 11.

The method of lap welding blanks is realized as follows:

The support 3 is set to the initial position, i.e. shifted to the stop 10. The clearance between the working surfaces of the cam 1 and support 3 is at a maximum. The blanks 4 (strips, bands, sheets) are assembled to overlap each other and inserted into the gap between the cam 1 and support 3, the ends of the blanks 4 being located on both sides of the axis of rotation of the cam 1 so as to exclude pinching of one of the blanks 4 by the end of the other blank 4 during the subsequent straining. This can be achieved by installing them at a certain distance from the vertical axis of the cam.

Then the drive of the cam 1 is activated; the cam rotates and grips the blanks 4 and, embedding into them, deforms them. When the cam 1 is embedded into the metal, the support 3 is entrained by the welded metal flowing out in the direction of rotation of the cam 1, because the coefficient of friction between the metal and the support 3 is one order higher than the coefficient of friction between the support 3 and the surface of the rolls 9 when the support moves over the latter.

The support 3 moves a certain distance in the direction of rotation of the cam 1.

The metals are welded when the clearance between the working surface of the cam 1 and the surface of the support 3 is at a minimum; in this case owing to the movement of the support 3 the ratio of the squeezing and flow speeds is maintained within 0.1 and 0.6. During the subsequent rotation of the cam 1, the clearance between the working surfaces of the cam 1 and the support 3 increases and the movement of the support 3 ceases. The welded blanks 4 are withdrawn.

In view of the fact that welding is performed at a certain distance from the ends of both blanks, these ends should be broken off after welding.

The support 3 returns to the initial position and the initial (maximum) clearance is restored between the working surfaces of the cam 1 and support 3.

The device is ready for the next operating cycle.

The blanks of ductile metals are lap-welded in the same manner.

Figure 4:
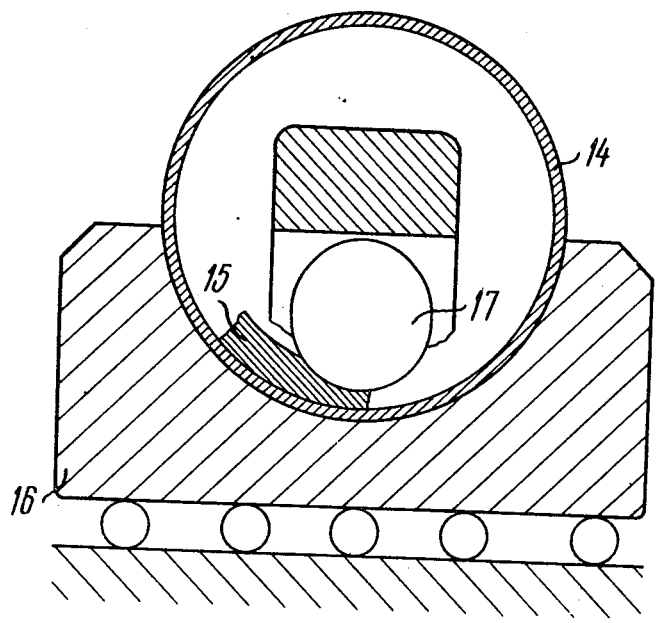
FIG. 4 is a cross section of a device for welding boss-shaped parts to the internal surface of pipe blanks.

For welding boss-shaped parts 15 to the internal surface of pipe-shaped blanks 14 (FIG. 4), the support 16 is of a semicircular shape and the cam 17 is inserted into the pipe 14. By moving the pipe during the constant rotation of the cam 17 it is possible to weld bosses 15 to the internal surface of the pipe 14.

The method is noted for simplicity and high output. For example, in continuous strip welding lines, the use of the method increases the output of the welding equipment, reduces the electric power consumption, frees the production areas and eventually steps up labor productivity approximately 1.5 times.

The invention can be used for cladding precision and heat-resistant metals and alloys.

The greatest effect will be produced by the claimed invention in welding heterogeneous metals and alloys, e.g. brass and constantan, phosphorous bronze and constantan, brass and bronze.

What is claimed is:

1. A method of pressure welding metal parts, said method comprising subjecting the metal parts to be welded to the squeezing pressure of a working tool sufficient to produce plastic deformation of the metal parts, and regulating the squeezing pressure of the tool and travel speed of the parts relative to the tool to maintain a ratio between the squeezing speed of the tool and the speed of flow of the metal at the instant of welding in a range between 0.1 and 0.6.

2. A method as claimed in claim 1 comprising heating low ductility metals to ensure the requisite plastic flow.

3. Apparatus for pressure welding metal parts, said apparatus comprising a rotatable working tool constituted as a cam, means for driving the cam in rotation, a support for the metal parts to be welded, said support being disposed beneath said tool so that welding of the metal parts is obtained by squeezing the parts between the tool and support being and means supporting said support for displacement in the direction of greatest deformation of the squeezed metal, said cam having a shape related to the movement of the support to provide a ratio between the squeezing speed of the cam into the metal parts being welded and the speed of flow of the metal at the instant of welding in a range between 0.1 and 0.6.

4. Apparatus as claimed in claim 3 wherein said means supporting said support provides the capability of displacement of said support in the direction of cam rotation at the point of contact of the cam with the parts to be welded.

5. Apparatus as claimed in claim 3 wherein the support comprises a flat table.

6. Apparatus as claimed in claim 3 wherein said cam has a fluted surface.

7. Apparatus as claimed in claim 3 wherein said support comprises a table having a fluted surface.

* * * * *